United States Patent
Honda

(10) Patent No.: US 9,494,684 B2
(45) Date of Patent: Nov. 15, 2016

(54) POSITION MEASUREMENT DEVICE

(71) Applicant: MURATA MANUFACTURING CO., LTD., Nagaokakyo-shi, Kyoto-Fu (JP)

(72) Inventor: Masayuki Honda, Nagaokakyo (JP)

(73) Assignee: MURATA MANUFACTURING CO., INC., Nagaokakyo-Shi, Kyoto-Fu (JP)

( * ) Notice: Subject to any disclaimer, the term of this patent is extended or adjusted under 35 U.S.C. 154(b) by 249 days.

(21) Appl. No.: 14/301,052

(22) Filed: Jun. 10, 2014

(65) Prior Publication Data
US 2014/0340993 A1 Nov. 20, 2014

Related U.S. Application Data

(63) Continuation of application No. PCT/JP2012/080678, filed on Nov. 28, 2012.

(30) Foreign Application Priority Data

Dec. 12, 2011 (JP) ................. 2011-271105

(51) Int. Cl.
*G01S 15/06* (2006.01)
*G01S 15/42* (2006.01)

(52) U.S. Cl.
CPC ............... *G01S 15/06* (2013.01); *G01S 15/42* (2013.01)

(58) Field of Classification Search
CPC .................. G01S 15/42; G01S 15/06
See application file for complete search history.

(56) References Cited

U.S. PATENT DOCUMENTS

| 7,724,355 B1 | 5/2010 | McIntosh et al. |
| 2006/0022680 A1 | 2/2006 | Suginouchi et al. |

(Continued)

FOREIGN PATENT DOCUMENTS

| CN | 102253367 A | 11/2011 |
| EP | 1 235 077 A2 | 8/2002 |

(Continued)

OTHER PUBLICATIONS

Japanese Office Action dated Jul. 7, 2015, issued for corresponding application No. JP2013-549195 (with English translation).

(Continued)

*Primary Examiner* — Daniel Pihulic
(74) *Attorney, Agent, or Firm* — Arent Fox LLP

(57) ABSTRACT

A position measurement device that measures three-dimensional coordinates of an object using ultrasound. The position measurement device includes a transmitter that emits an ultrasonic wave; three receivers that receive an ultrasonic wave; a time determination unit that determines an arrival time candidate for each of the receivers wherein the arrival time candidate is a time period from emission to arrival of the ultrasonic wave after being reflected from an object, and determines a plurality of the arrival time candidates for at least one of the receivers; a coordinate calculation unit that calculates a plurality of candidates of three-dimensional coordinates indicative of positions of the object based on the arrival time candidates determined by the time determination unit and relative positions of the transmitter and the receivers; and a coordinate determination unit that determines the three-dimensional coordinates of the object based on the plurality of candidates of three-dimensional coordinates.

20 Claims, 11 Drawing Sheets

(56) References Cited

U.S. PATENT DOCUMENTS

| | | | |
|---|---|---|---|
| 2007/0121097 A1* | 5/2007 | Boillot | G01S 15/104 356/28 |
| 2010/0049452 A1 | 2/2010 | Suginouchi et al. | |
| 2011/0148798 A1 | 6/2011 | Dahl | |
| 2014/0340993 A1* | 11/2014 | Honda | G01S 15/42 367/99 |

FOREIGN PATENT DOCUMENTS

| JP | H01-237483 A | 9/1989 | | |
|---|---|---|---|---|
| JP | H03-71007 U | 7/1991 | | |
| JP | H05-14962 U | 2/1993 | | |
| JP | H05014962 U | 2/1993 | | |
| JP | H06-188328 A | 7/1994 | | |
| JP | H06-188330 A | 7/1994 | | |
| JP | H09-274077 A | 10/1997 | | |
| JP | 3810430 B2 | 8/2006 | | |
| JP | 2006-317356 A | 11/2006 | | |
| JP | 2006-349608 A | 12/2006 | | |
| JP | 2007-139570 A | 6/2007 | | |
| JP | 2007-322224 A | 12/2007 | | |
| JP | 2007-322225 A | 12/2007 | | |
| JP | 2011-522271 A | 7/2011 | | |
| JP | WO 2013088951 A1 * | 6/2013 | | G01S 15/42 |
| JP | EP 2793044 A4 * | 6/2015 | | G01S 15/42 |
| WO | WO 2010/010832 A1 | 1/2010 | | |

OTHER PUBLICATIONS

Imai Kensuke, and four others, "Construction of Three-dimension Measurement Systems of teh High-speed Moving Object Using Ultrasonic Sensor", Research Report, Kanto Gakuin University Kogakukai, Mar. 2007, vol. 50, Second issue, pp. 67-73.

Written Opinion and International Search Report issued in PCT/JP2012/080678, mailed on May 3, 2013.

Chinese Office Action dated Jun. 2, 2015, in corresponding Chinese Patent Application No. 201280061059.0.

International Search Report issued for PCT/JP2012/080678, dated Mar. 5, 2013.

* cited by examiner

THREE-DIMENSIONAL COORDINATE OUTPUT

POSITION MEASUREMENT DEVICE

CROSS REFERENCE TO RELATED APPLICATIONS

The present application is a continuation of PCT/JP2012/080678 filed Nov. 28, 2012, which claims priority to Japanese Patent Application No. 2011-271105, filed Dec. 12, 2011, the entire contents of each of which are incorporated herein by reference.

FIELD OF THE INVENTION

The present invention relates to position measurement devices that measure object positions using ultrasound.

BACKGROUND OF THE INVENTION

Previously, position measurement devices that measure object positions using ultrasound are known. The following Non-Patent Document 1 describes a position measurement device that measures a distance to an object using ultrasound and calculates three-dimensional coordinates of an object based on the distance measured. In the position measurement device described in the following Non-Patent Document 1, an ultrasonic wave is emitted from a ground to an upward direction, and a reflected wave, which is reflected from a model airplane flying above, is received with three receivers. Next, this position measurement device determines reception timing of the reflected wave at each receiver based on a received wave of each receiver. Subsequently, based on the timing thus determined, a calculation is performed to obtain a propagation distance of the emitted ultrasonic wave that is reflected from the model airplane and returned to each receiver. Further, the position measurement device calculates three-dimensional coordinates of the model airplane based on the three propagation distances obtained at the respective receivers.

Non-Patent Document 1: IMAI Kensuke, and four others, "Construction of Three-dimension Measurement Systems of the High-speed Moving Object Using Ultrasonic Sensor", Research Report, Kanto Gakuin University Kogakukai, March 2007, Vol. 50, Second Issue, pages 67-73.

The foregoing received wave includes various noises. Further, the received wave may sometimes include an ultrasonic wave reflected from an object other than a target object of measurement as noise. Thus, the reception timing of the reflected wave may be determined incorrectly if it is determined that the reflected wave is received when level of the received wave exceeds a threshold. This leads to an error in determining an arrival time, a time period starting from the emission of ultrasonic wave to the arrival at the receiver after being reflected from an object, thereby adding an error to the propagation distance calculated using this arrival time. Further, the three-dimensional coordinates are calculated using the respective propagation distances of the three receivers. Thus, errors of the three propagation distances are superimposed in calculation results. Accordingly, the three-dimensional coordinates that are obtained as the calculation results become less accurate.

SUMMARY OF THE INVENTION

The present invention is made to resolve the foregoing problem, and an object thereof is to provide a position measurement device that measures three-dimensional coordinates of an object using ultrasound and is capable of improving measurement accuracy by reducing noise effects.

A position measurement device according to the present invention measures an object position using ultrasound, and includes: a transmitter that emits an ultrasonic wave; and at least three receivers that receive an ultrasonic wave; a time determination unit that determines an arrival time candidate for each receiver based on a received wave received by each receiver wherein the arrival time candidate is a time period from emission to arrival of the ultrasonic wave after being reflected from an object, and determines a plurality of the arrival Lime candidates for at least one of the receivers; a coordinate calculation unit that calculates a plurality of candidates of three-dimensional coordinates indicative of positions of the object based on the arrival time candidates determined by the time determination unit and relative positions of the transmitter and the receivers; and a coordinate determination unit that determines three-dimensional coordinates of the object based on the plurality of candidates of three-dimensional coordinates calculated by the coordinate calculation unit.

The position measurement device according to the present invention enables to determine, based on the reflected waves, a plurality of the arrival time candidates, each being the time period from the emission to arrival of the ultrasonic wave at the receiver after being reflected from an object. In general, the received wave includes noises. When an attempt is made to determine a single arrival time from the reflected wave, it is likely that an erroneous arrival time may be determined due to noise effects. In other words, it is likely that the arrival time may not be determined with high accuracy. On the other hand, in the present invention, the possibility of being able to determine the arrival time with high accuracy may be improved since a plurality of the arrival time candidates are determined. Further, in the present invention, a plurality of the candidates of three-dimensional coordinates is calculated based on the plurality of arrival time candidates thus determined, thereby making it possible to improve the possibility of obtaining accurate candidates of three-dimensional coordinates. Further, the three-dimensional coordinates of the object is determined based on these candidates of three-dimensional coordinates, thereby making it possible to improve the possibility of obtaining accurate three-dimensional coordinates. Accordingly, in the position measurement device that measures three-dimensional coordinates of an object using ultrasound, the measurement accuracy may be improved by reducing noise effects.

Preferably, the position measurement device according to the present invention may further include: a memory unit that stores a direct wave in advance, the direct wave being emitted from the transmitter and directly received by the receiver without being reflected from any object; and a reflected wave acquisition unit that obtains a reflected wave arrived at the receiver after being reflected from an object by subtracting the direct wave stored in the memory unit from the received wave that is received by the receiver. Further, it is preferable that the time determination unit may determine a plurality of the arrival time candidates based on the reflected wave obtained by the reflected wave acquisition unit.

In this case, the direct wave is subtracted from the received wave. This enables to obtain the reflected wave that is reflected back from the object. This prevents from erroneously identifying, as the arrival time candidate, a propagation time of the ultrasonic wave that arrives at the receiver without being reflected from any object. Accordingly, errors in the measurement results may be avoided.

Preferably, in the position measurement device according to the present invention, the time determination unit may determine the arrival time candidate based on timing at which a peak occurs in an envelope of the reflected wave obtained by the reflected wave acquisition unit.

In this case, the envelop peak in the reflected wave is identified. Thus, it is not necessary to perform processing on every peak in the reflected wave to determine the arrival time candidate. This reduces processing load.

Preferably, in the position measurement device according to the present invention, the time determination unit may determine the arrival time candidates based on timings at which, of peaks in the reflected wave, a predetermined number of peaks occurs in the reflected wave immediately before or immediately after or immediately before and after the envelope peak in the reflected wave.

In this case, of peaks in the reflected wave, the arrival time candidates are determined for the predetermined number of peaks occurring in the reflected wave immediately before or immediately after or immediately before and after the envelope peak in the reflected wave. According to the inventor's study, experimental results indicate that, of peaks in the reflected wave, the peak that occurs near the envelope peak may correspond to the timing at which the ultrasonic wave actually arrives at the receiver in some cases. Accordingly, noise effects may be reduced and more accurate arrival time candidates may be determined when the arrival time candidates are determined for a predetermined number of peaks occurs in the reflected wave immediately before or immediately after or immediately before and after the envelope peak. This further improves the measurement accuracy.

Preferably, in the position measurement device according to the present invention, the transmitter may emit a modulated ultrasonic wave, and the time determination unit may calculate a cross-correlation function for the reflected wave obtained by the reflected wave acquisition unit and the direct wave stored in the memory unit and determines the arrival time candidate based on the cross-correlation function.

The waveform representing the cross-correlation function for the reflected wave and the direct wave has sharper peaks. Thus, in the foregoing case, temporal resolution may be improved in determining the arrival time candidate. Further, the noise effects may be reduced. Accordingly, the arrival time candidate may be determined with a higher accuracy, and the measurement accuracy may be further improved.

Preferably, in the position measurement device according to the present invention, the transmitter may emit an ultrasonic wave in response to a modulated drive signal, and the time determination unit may calculate a cross-correlation function for the drive signal and the reflected wave obtained by the reflected wave acquisition unit and determines the arrival time candidate based on the cross-correlation function.

The waveform representing the cross-correlation function for the reflected wave and the drive signal has sharper peaks. Thus, in the foregoing case, the temporal resolution may be improved in determining the arrival time candidate. Further, the noise effects may be reduced. Accordingly, the arrival time candidate may be determined with a higher accuracy, and the measurement accuracy may be further improved.

Preferably, in the position measurement device according to the present invention, the time determination unit may make a determination for each member of the plurality of the arrival time candidates determined as to whether the member in question is to be excluded or not, based on propagation distances calculated for respective members of the plurality of the arrival time candidates and a propagation distance used for calculating three-dimensional coordinates determined by the coordinate determination unit at a last process cycle.

In this case, screening of the arrival time candidates is performed after listing up the plurality of arrival time candidates based on the propagation distance obtained at the last process cycle. For example, the arrival time candidate determined at the current process cycle may be excluded if a difference between the propagation distance obtained at the last process cycle and the propagation distance of the arrival time candidate in question is equal to or larger than a threshold. This excludes the propagation distance that differs considerably from the last propagation distance. Accordingly, the measurement accuracy may be further improved.

Preferably, in the position measurement device according to the present invention, the coordinate calculation unit may calculate the candidates of three-dimensional coordinates for all possible combinations of the arrival time candidates, one for each receiver, selected from the plurality of arrival time candidates determined by the time determination unit.

In this case, when calculating the candidate of three-dimensional coordinates by selecting one arrival time candidate for each receiver from the plurality of arrival time candidates, one candidate of three-dimensional coordinates is calculated for each of all the possible combinations of the arrival time candidates, one for each receiver. As a result, the candidates of three-dimensional coordinate are calculated as much as the number of the combinations. Further, based on the candidates of three-dimensional coordinates thus calculated, the three-dimensional coordinates of the object is determined. In this way, the three-dimensional coordinates of object is determined after listing up the candidates of three-dimensional coordinates obtained from all the possible combinations of the arrival time candidates. Thus, the measurement accuracy may be further improved.

Preferably, in the position measurement device according to the present invention, the coordinate determination unit may determine one out of the plurality of candidates of three-dimensional coordinates calculated by the coordinate calculation unit, a distance to which from three-dimensional coordinates determined at the last process cycle is a shortest, as the three-dimensional coordinates of the object.

In this case, of the plurality of candidates of three-dimensional coordinates, the candidate of three-dimensional coordinates, the foregoing distance of which is the shortest, is determined as the three-dimensional coordinates of the object. Here, it is considered that, the plurality of candidates of three-dimensional coordinates, the candidate of three-dimensional coordinates that is closer to the last three-dimensional coordinates is more likely to be closer to the actual three-dimensional coordinates than the other, more-distant candidates of three-dimensional coordinates. This enables to determine a most probable three-dimensional coordinates based on the three-dimensional coordinates obtained at the last process cycle. In other words, the measurement accuracy may be further improved.

Preferably, in the position measurement device according to the present invention, the coordinate determination unit may determine whether or not to accept the three-dimensional coordinates determined at the current process cycle based on a distance between the three-dimensional coordinates determined at the current process cycle and the three-dimensional coordinates determined at the last process cycle.

In this case, it is determined whether or not to accept the three-dimensional coordinates determined at the current process cycle based on the distance between the three-dimensional coordinates determined at the current process cycle and the three-dimensional coordinates determined at the last process cycle. This excludes the determined three-dimensional coordinates, where they designate a position far away from the three-dimensional coordinates obtained at the last process cycle. In this way, validity of the three-dimensional coordinates thus obtained is determined. Thus, errors in the measurement results may be avoided.

Preferably, the position measurement device according to the present invention may further include a determination unit that determines whether or not a target object of measurement is present inside a measurement range, and the memory unit may store the received wave received by the receiver as the direct wave when the determination unit determines the absence of the target object of measurement inside the measurement range.

In this case, the direct wave may be automatically obtained and stored. Note that the timing at which the direct wave arrives at the receiver may vary depending on external environments since the speed of sound varies depending on external environments such as temperature, flow speed of media, and the like. Here, according to the foregoing preferred embodiment, the direct wave may be obtained in the environments under which the actual position measurement is performed, and the direct wave thus obtained may be stored. This allows the reflected wave to be obtained using the direct wave reflecting the actual measurement environments. Thus, the measurement accuracy may be further improved by reducing effects of the external environments.

Preferably, in the position measurement device according to the present invention, the transmitter and the three receivers may be arranged on a same plane and at positions of respective vertices of rectangle.

In this case, the transmitter and the receivers are arranged on the same plane. Thus, the three-dimensional coordinates may be determined when the arrival time candidates for the three receivers are obtained. In other words, the position measurement device does not require four or more receivers, and may be able to determine the three-dimensional coordinates by using only three receivers. Further, the transmitter and the three receivers are arranged at positions of respective vertices of rectangle. Thus, the three-dimensional coordinates of the object may be determined when the object is located inside an area including a front space of an area surrounded by that rectangle and its surrounding space. For example, the position measurement device according to the present invention may be installed in an apparatus in which a display is arranged on the area surrounded by the rectangle. This enables to perform non-contact measurements of three-dimensional coordinates of a user's finger that is being moved to follow contents of the display. In this case, the position measurement device according to the present invention may be allowed to function as an input device.

According to the present invention, the measurement accuracy may be improved by reducing noise effects in the position measurement device that measures three-dimensional coordinates of an object using ultrasound.

DETAILED DESCRIPTION OF THE PREFERRED EMBODIMENTS

Figure 1:
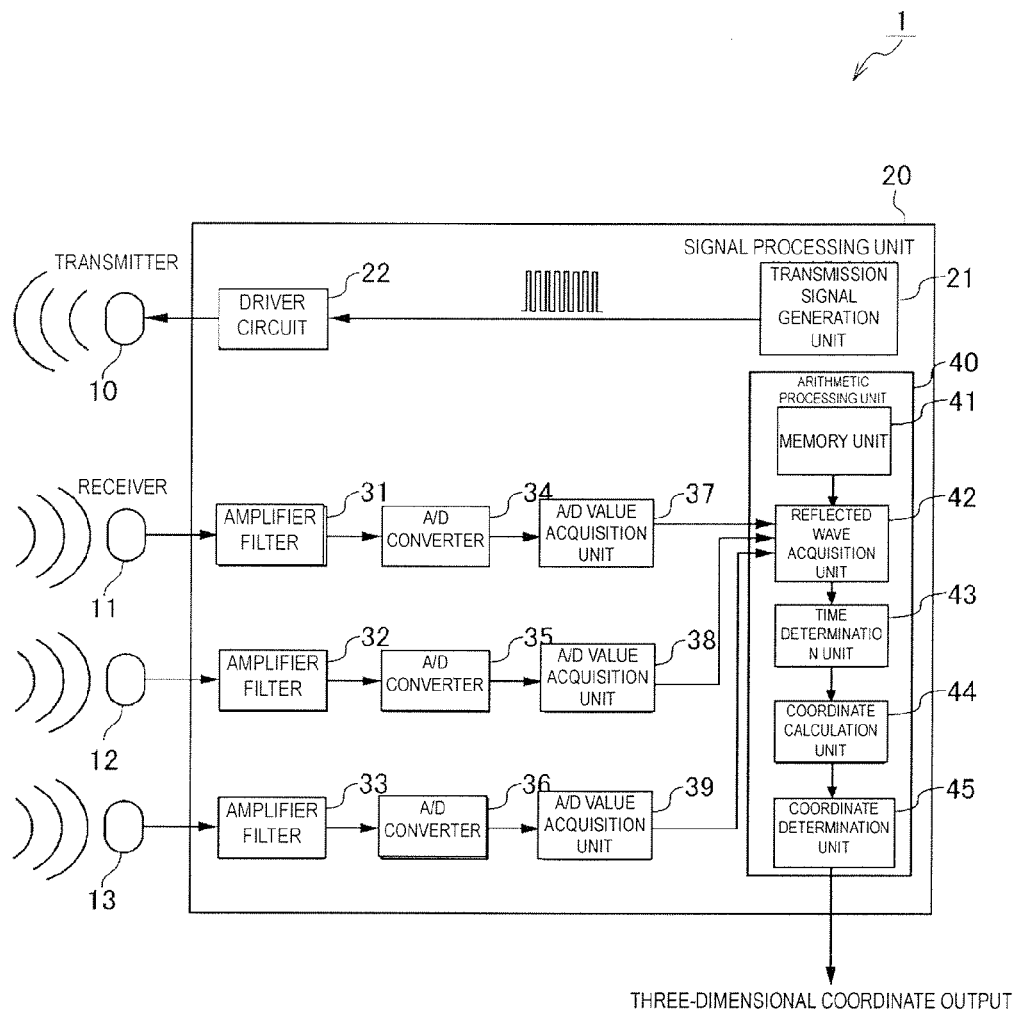
FIG. 1 is a block diagram illustrating a configuration of a position measurement device according to a first embodiment.

Hereinafter, preferred embodiments of the present invention are described with reference to the drawings. Like reference numerals refer like elements throughout the drawings, and redundant descriptions thereof are abbreviated.

First Embodiment

First, referring to FIG. 1, the configuration of a position measurement device 1 according to the first embodiment is described. FIG. 1 is a block diagram illustrating the configuration of the position measurement device 1. The position measurement device 1 is a device that measures three-dimensional coordinates of an object using ultrasound. Specifically, the position measurement device 1 includes a transmitter 10 that emits an ultrasonic wave and three receivers 11 to 13 that receive an ultrasonic wave, and obtains arrival times that are time periods starting from the emission of an ultrasonic wave to its arrivals at the respective receivers 11 to 13 after being reflected from an object. Here, the position measurement device 1 obtains a plurality of arrival time candidates in consideration of noise effects in the received wave. Further, the position measurement device 1 calculates a plurality of candidates of three-dimensional coordinate of the object based on the plurality of arrival time candidates of the three receivers 11 to 13, and subsequently determines one candidate of three-dimensional coordinates as the three-dimensional coordinates of the object.

Figure 2:
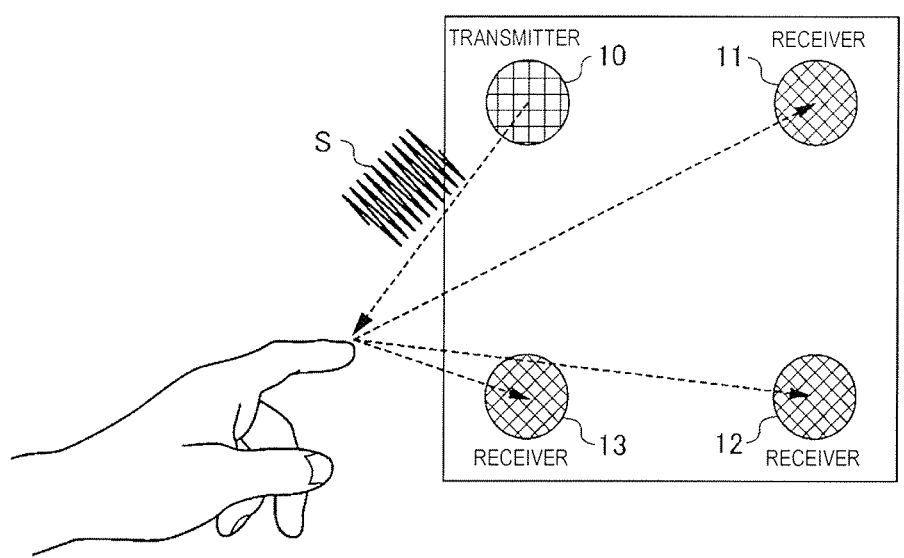
FIG. 2 is a diagram illustrating an exemplary mode of use of a position measurement device according to the first embodiment.

FIG. 2 is a diagram illustrating an exemplary mode of use of the position measurement device 1. As illustrated in FIG. 2, for example, the position measurement device 1 may perform non-contact measurements of three-dimensional coordinates of a fingertip. The position measurement device 1 is capable of measuring a finger motion by performing a continuous measurement of the three-dimensional coordinates of the fingertip. The transmitter 10 and the three receivers 11 to 13 are arranged on the same plane, and an area including a front space of that plane is defined as a measurement range. In the example of FIG. 2, the transmitter 10 and the three receivers 11 to 13 are arranged at positions of respective apexes of square. For example, the measurement range is a square area whose each side is about 12 cm long and within a range of about 10 cm from that plane when the transmitter 10 and the three receivers 11 to 13 are arranged at positions of respective apexes of a square whose each side is about 6 cm long.

Figure 3:
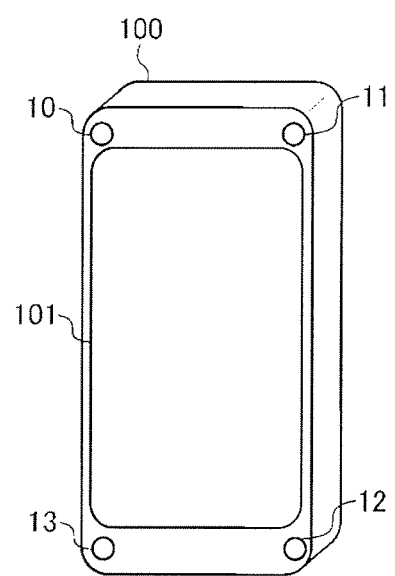
FIG. 3 is a diagram illustrating an example in which a position measurement device according to the first embodiment is installed in another apparatus as an input device.

Further, as illustrated in FIG. 3, the position measurement device 1 may be installed in an apparatus 100 that has a rectangular display 101 and allowed to function as an input device. In FIG. 3, a smartphone is illustrated as an example of the apparatus 100. Here, the smartphone means a mobile phone including a display for displaying not only characters but also a variety of information such as images and the like. The transmitter 10 and the three receivers 11 to 13 are arranged at outsides of four corners of the rectangular display 101. The position measurement device 1 is capable of performing the continuous non-contact measurement of three-dimensional coordinates of an index finger tip inside the measurement range in front of the display 101. This allows the position measurement device 1 to detect the finger motion when a user moves the finger in front of the display 101 to follow contents of the display 101, thereby making it possible to input information to the apparatus 100. In other words, the position measurement device 1 may function as a non-contact input device.

Returning to FIG. 1, a signal processing unit 20 included in the position measurement device 1 is described. The signal processing unit 20 includes a transmission signal generation unit 21 and a driver circuit 22 for driving the transmitter 10. The transmission signal generation unit 21 generates a drive signal at an ultrasonic frequency and outputs to the driver circuit 22. The driver circuit 22 amplifies the drive signal inputted and supplies an amplified drive signal to the transmitter 10. The transmitter 10 may, for example, include a resonator that is configured by use of piezoelectric ceramics, and the resonator resonates in response to the drive signal inputted. This emits an ultrasonic wave.

The transmission signal generation unit 21 outputs the drive signal in burst mode, and the transmitter 10 emits ultrasonic wave in burst mode. For example, a burst cycle may be about 10 ms. The ultrasonic wave may be emitted for about 0.3 ms, and the receivers 11 to 13 receive the ultrasonic wave that is reflected from an object before the next burst cycle starts. FIG. 2 schematically illustrates an emitted wave S emitted from the transmitter 10. An actual waveform of the emitted wave S emitted from the transmitter 10 has smaller amplitudes at the beginning portion and the ending portion. At the beginning portion, the amplitude is smaller because vibration of the resonator is smaller right after the start of drive operation at the transmitter 10. At the ending portion, the smaller amplitude is caused by echo at the resonator that remains after the output of drive signal ends.

The signal processing unit 20 includes A/D converters 34 to 36 and amplifier/filters 31 to 33, each functioning as an input interface of a received signal (received wave) received by the receivers 11 to 13, and further includes A/D value acquisition units 37 to 39. The amplifier/filters 31 to 33 are each composed of an amplifier circuit, a filter circuit, and the like. The amplifier/filters 31 to 33 amplify received signals received at the respective receivers 11 to 13, remove frequency components other than an intended frequency component, and output resulting signals to the A/D converters 34 to 36.

The A/D converters 34 to 36 convert inputted analog signals to digital signals. The A/D value acquisition units 37 to 39 control operations of the corresponding A/D converters 34 to 36, and obtain received signals that are converted into digital data by the A/D converters 34 to 36. In other words, the received signals that represent received waves received by the respective receivers 11 to 13 are obtained with the respective A/D value acquisition units 37 to 39.

The signal processing unit 20 includes an arithmetic processing unit 40 that computes the three-dimensional coordinates of the object by processing the received waves (received signals) obtained. Note that the arithmetic processing unit 40 as well as the foregoing transmission signal generation unit 21 and the A/D value acquisition units 37 to 39 are composed of a CPU, a ROM, a RAM, and the like. Functions of the arithmetic processing unit 40, the transmission signal generation unit 21, and the A/D value acquisition units 37 to 39 are each implemented by running programs stored in the ROM on the CPU. Note that, in place of the CPU, an ASIC, a FPGA, a DSP or the like may be used for example.

The arithmetic processing unit 40 includes, in term of functionality, a memory unit 41, a reflected wave acquisition unit 42, a time determination unit 43, a coordinate calculation unit 44, and a coordinate determination unit 45. The memory unit 41 stores waveforms of direct waves. The direct wave is a wave that is not reflected from any object, but directly travels from the transmitter 10 to and received at the respective receivers 11 to 13. The memory unit 41 stores the direct waves in connection with their respective receivers 11 to 13. These three direct waves are stored in the memory unit 41 prior to the start of an actual three-dimensional measurement.

When the measurement starts and the ultrasonic wave emitted is received, the reflected wave acquisition unit 42 makes input of the received signals (received waves) obtained with the respective A/D value acquisition units 37 to 39. The received wave includes the direct wave and a reflected wave overlapped each other. The reflected wave is an ultrasonic wave that is emitted from the transmitter 10, reflected from an object, and arrived at and received by the receivers 11 to 13. The reflected wave acquisition unit 42 subtracts a waveform of the direct wave stored in the memory unit 41 from a waveform of each received wave to obtain the reflected wave.

Figure 4:
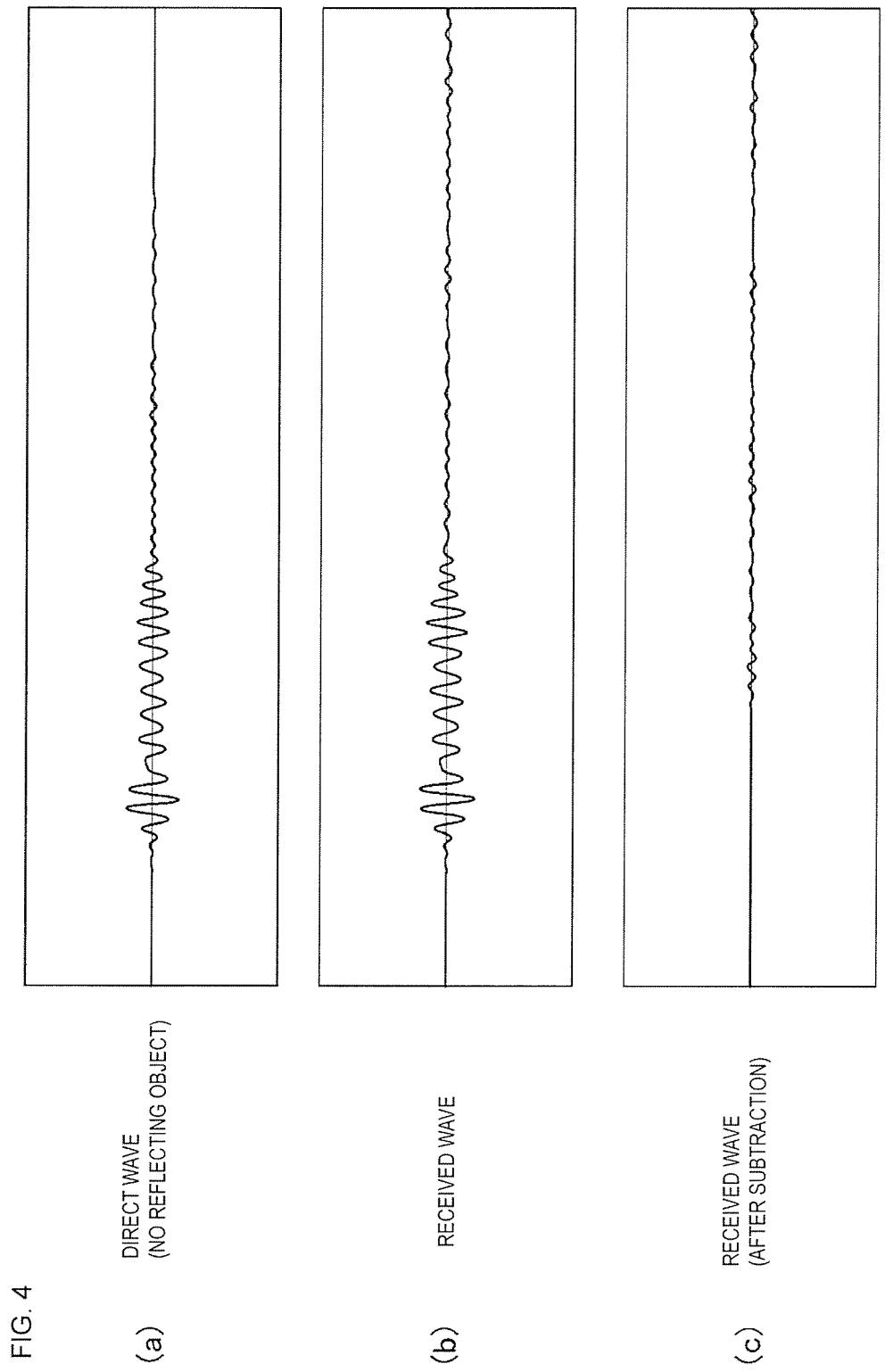
FIG. 4 is a diagram illustrating waveforms of a direct wave, a received wave, and a reflected wave obtained at a position measurement device according to the first embodiment.

FIG. 4 is a diagram illustrating waveforms of the direct wave, the received wave, and the reflected wave obtained at the position measurement device 1. FIG. 4(a) illustrates the waveform of the direct wave, which is a waveform received by the receiver 11 when no reflecting object is present inside the measurement range. FIG. 4(b) is the waveform received by the receiver 11 when a reflecting object that serves as a target of measurement, is present inside the measurement range. FIG. 4(c) illustrates the waveform of the reflected wave at the receiver 11, and is a waveform obtained by subtracting the waveform of FIG. 4(a) from the waveform of FIG. 4(b). Reflected waves at the receivers 12 and 13 are similarly obtained. In this way, the reflect wave is obtained by subtracting the direct wave from the received wave. This prevents from erroneously determining a propagation time of the ultrasonic wave that arrives at the receivers 11 to 13 without being reflected from an object as the arrival time candidate.

The time determination unit 43 determines the arrival time candidates for each of the receivers 11 to 13 based on the corresponding reflected wave obtained by the reflected wave acquisition unit 42. The arrival time candidate is a candidate for the propagation time that it takes for the ultrasonic wave to travel from the emission from the transmitter 10 to the arrival at the receivers 11 to 13 after being reflected from an object. The time determination unit 43 determines a plurality of the arrival time candidates for each of the three receivers 11 to 13. The arrival time candidates include a candidate determined based on a timing at which a peak in the envelope of the reflected wave occurs and candidates determined based on timings at which, of peaks in the reflected wave, predetermined number of peaks in the reflected wave occur immediately before and after the peak in the envelope of the reflected wave.

Figure 5:
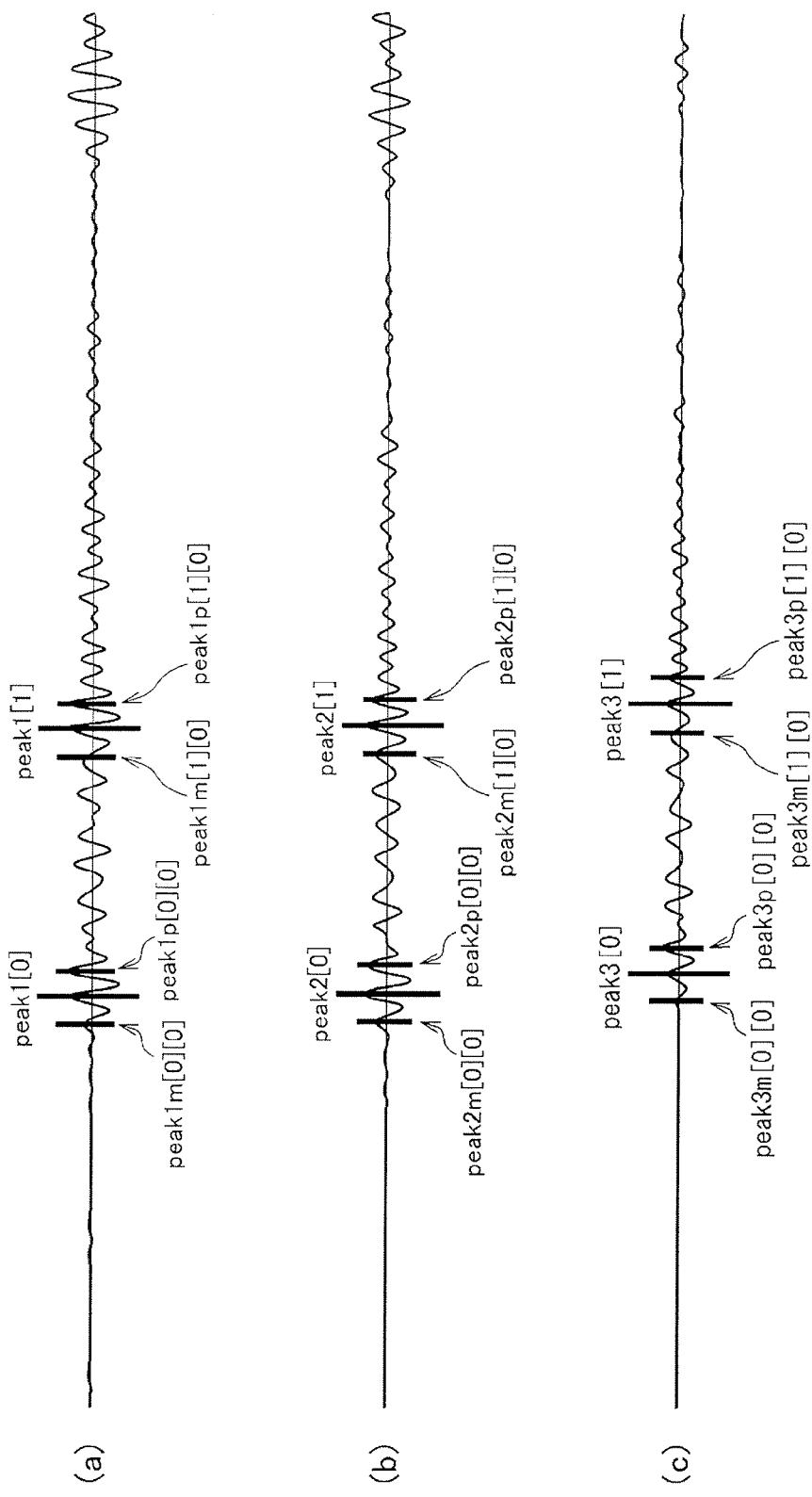
FIG. 5 is a diagram for illustrating an arrival time candidate determination method based on a reflected wave with a position measurement device according to the first embodiment.

Referring to FIG. 5, a determination method performed with the time determination unit 43 is described. FIGS. 5(*a*) to 5(*c*) illustrate the reflected waves obtained with the three receivers 11 to 13, respectively. Referring to the waveform of FIG. 5(*a*), a method for determining arrival time candidates for the receiver 11 is specifically described. First, the time determination unit 43 identifies, of peaks in the envelope of the reflected wave, first peaks (peak 1[i]) that are equal to or larger than a predetermined threshold are identified from the beginning. In the example illustrated in FIG. 5, the parameter i is equal to 2. That is, peak 1[0] and peak 1[1] are identified. In this way, the peaks in the envelop of the reflected wave are identified, and processing is not performed on every peak in the reflected wave. Thus, processing load may be reduced.

Next, the time determination unit 43 identifies j peak(s) (peak 1m) in the reflected wave occurred immediately before the envelop peak (peak 1[i]) and j peak(s) (peak 1p) in the reflected wave occurred immediately after the envelop peak (peak 1[i]). In the example illustrated in FIG. 5(*a*), the parameter j is equal to 1. That is, peak 1m, peak 1p, peak 1m, and peak 1p are identified. This is because, of the peaks in the reflected wave, a peak near the envelope peak may sometimes indicate timing at which the ultrasonic wave actually arrives at one of the receivers 11 to 13.

Next, the time determination unit 43 calculates time periods from the emission of the ultrasonic wave to the respective timings at which the peaks thus identified occur. These time periods are arrival time candidates $t_1$ for the receiver 11. In the example illustrated in FIG. 5(*a*), six peaks are identified in total for the receiver 11. Thus, six arrival time candidates $t_1$ are determined. Similarly, with regard to the receivers 12 and 13, six arrival time candidates $t_2$ and six arrival time candidates $t_3$ are determined based on the reflected waves of FIG. 5(*b*) and FIG. 5(*c*), respectively. Note that the parameters i and j may be arbitrarily set.

Some of the arrival time candidates $t_1$ to $t_3$ determined by the foregoing processing may be products of noise effects. Thus, the time determination unit 43 makes an determination for each member of the plurality of the arrival time candidates as to whether the member in question is to be excluded or not, for each of the receivers 11 to 13, based on the propagation distance used for calculating the three-dimensional coordinates determined at the last process cycle, namely, during processing for the last burst. Describing the case for the receiver 11 in more concrete terms, the time determination unit 43 obtains differences between the propagation distance of the receiver 11 used for calculating the three-dimensional coordinates determined at the last process cycle and propagation distances $v \times t_1$ obtained by multiplying respective ones of the six arrival time candidates $t_1$ by the speed of sound v. Further, the time determination unit 43 excludes the arrival time candidate the difference of which is equal to or larger than a threshold d from the arrival time candidates $t_1$.

The threshold d may be set in response to a maximum movement speed of object permissible to the position measurement device 1. When the target object of measurement is a finger operating a smartphone and a burst cycle is 10 ms, the permissible maximum movement speed may be set at about 1 m/s, and the threshold d may be set at about 10 mm. The time determination unit 43 further makes a determination for each member of the six arrival time candidates $t_2$ and the six arrival time candidates $t_3$ of the receivers 12 and 13 as to whether the member in question should be excluded or not. In this way, screening of the arrival time candidates is performed based on the propagation distance obtained at the last process cycle. This reduces the number of the arrival time candidates only to the ones that have comparably higher accuracy. Further, the amount of coordinate calculations that follow may be reduced since the screening of the arrival time candidates is performed in this stage.

The coordinate calculation unit 44 calculates a plurality of candidates of three-dimensional coordinates indicative of positions of the object based on the arrival time candidates $t_1$ to $t_3$ whose differences from the propagation distance obtained at the last process cycle is less than the threshold d, namely, the arrival time candidates $t_1$ to $t_3$ thus screened. Here, the following set of simultaneous equations (1) holds, where (0, 0, 0) are the three-dimensional coordinates of the transmitter 10, $(x_1, y_1, 0)$ are the three-dimensional coordinates of the receiver 11, $(x_2, y_2, 0)$ are the three-dimensional coordinates of the receiver 12, $(x_3, y_3, 0)$ are the three-dimensional coordinates of the receiver 13, and v is the speed of sound.

[Math 1]

$$\left. \begin{array}{l} \sqrt{(x-x_1)^2 + (y-y_1)^2 + z^2} + \sqrt{x^2 + y^2 + z^2} = v \cdot t_1 \\ \sqrt{(x-x_2)^2 + (y-y_2)^2 + z^2} + \sqrt{x^2 + y^2 + z^2} = v \cdot t_2 \\ \sqrt{(x-x_3)^2 + (y-y_3)^2 + z^2} + \sqrt{x^2 + y^2 + z^2} = v \cdot t_3 \end{array} \right\} \quad (1)$$

The coordinate calculation unit 44 calculates the candidates of three-dimensional coordinates by solving the foregoing simultaneous equations (1) for all possible combinations of the arrival time candidates. Here, each combination is composed of three arrival time candidates, one for each of the receivers 11 to 13, selected from the plurality of arrival time candidates $t_1$ to $t_3$. This calculates a plurality of the candidates of three-dimensional coordinates. The number of all the possible combinations, namely, the number of the candidates of three-dimensional coordinates to be calculated reaches a maximum when no candidate is excluded at the foregoing screening process. In that case, $((2j+1)i)^3$ candidates of three-dimensional coordinates are calculated.

The coordinate determination unit 45 determines the three-dimensional coordinates of the object based on the plurality of the candidates of three-dimensional coordinates calculated at the coordinate calculation unit 44. In the present embodiment, of the plurality of the candidates of three-dimensional coordinates, the coordinate determination unit 45 determines one candidate of three-dimensional coordinates, the distance to which from the three-dimensional coordinates determined at the last process cycle (last burst) is the shortest, as the three-dimensional coordinates of the object. It is considered that, of the plurality of candidates of three-dimensional coordinates, the possibility of being close to the actual three-dimensional coordinates is higher for the candidate of three-dimensional coordinates that is closer to the last three-dimensional coordinates than the distant one. Accordingly, accurate three-dimensional coordinates may be obtained when the foregoing criteria are employed during the continuous measurement of the three-dimensional coordinates of the object.

Further, the coordinate determination unit 45 determines whether or not to accept the three-dimensional coordinates determined at the current process cycle based on the distance between the three-dimensional coordinates determined at the current process cycle and the three-dimensional coordinates determined at the last process cycle. Specifically, the coordinate determination unit 45 does not accept nor output the three-dimensional coordinates determined at the current process cycle as a measurement result when the distance between the three-dimensional coordinates determined at the current process cycle and the three-dimensional coordinates determined at the last process cycle is equal to or larger than a threshold D. The threshold D may be set at the same value as the foregoing threshold d. This excludes data when the determined three-dimensional coordinates designate a position far away from the three-dimensional coordinates obtained at the last process cycle. Accordingly, errors in the measurement results may be avoided.

Figure 6:
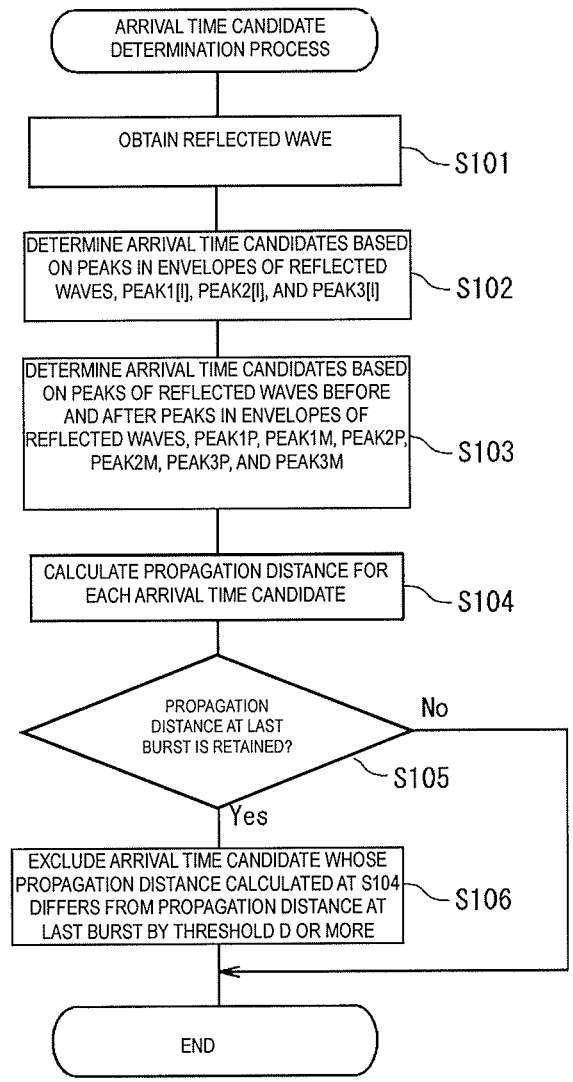
FIG. 6 is a flowchart illustrating process steps of an arrival time candidate determination process based on a reflected wave with a position measurement device according to the first embodiment.

Next, the operation of the position measurement device 1 is described. Referring to FIG. 6, first, the operation for determining the arrival time candidates is described. FIG. 6 is a flowchart illustrating process steps of an arrival time candidate determination process. The process of FIG. 6 is repeated at every burst cycle during which an ultrasonic wave is emitted.

First, the transmission signal generation unit 21 outputs a drive signal to the driver circuit 22, and the transmitter 10 emits an ultrasonic wave. The ultrasonic wave emitted is received by the receivers 11 to 13. Subsequently, in step S101, the reflected wave acquisition unit 42 obtains a reflected wave by subtracting a direct wave stored in the memory unit 41 from a received wave. In step S102, i peaks in the envelope of the reflected wave are identified for each of the receivers 11 to 13, and arrival time candidates are determined based on these peaks.

Further, in step S103, of peaks in the reflected wave, peaks before and after the peak in the envelope are identified, and arrival times determined based on these peaks are added to the arrival time candidates. In the foregoing example of FIG. 5, the process steps described above determine six arrival time candidates for each of the receivers 11 to 13. Subsequently, in step S104, propagation distances are calculated by multiplying the respective arrival time candidates by the speed of sound. Next, in step S105, it is determined whether the propagation distance used for calculating the three-dimensional coordinates finally determined at the last burst process cycle is retained or not.

When the propagation distance of the last burst is retained, the process proceeds to step S106. In step S106, of the propagation distances calculated in step S104, the one that differs from the propagation distance of the last burst by the threshold d or more is excluded. The process of step S106 allows to screen the arrival time candidates obtained in steps S102 and S103. In this case, the following three-dimensional coordinate determination process is performed by using the arrival time candidates thus screened. Note that a signal indicative of the presence of no object inside the measurement range is outputted when all the arrival time candidates are excluded in at least one of the three receivers 11 to 13.

On the other hand, in step S105, when the propagation distance of the last burst is not retained, the arrival time candidate determination process ends. In this case, the following three-dimensional coordinate determination process is performed by using all the arrival time candidates obtained in steps S102 and S103.

Figure 7:
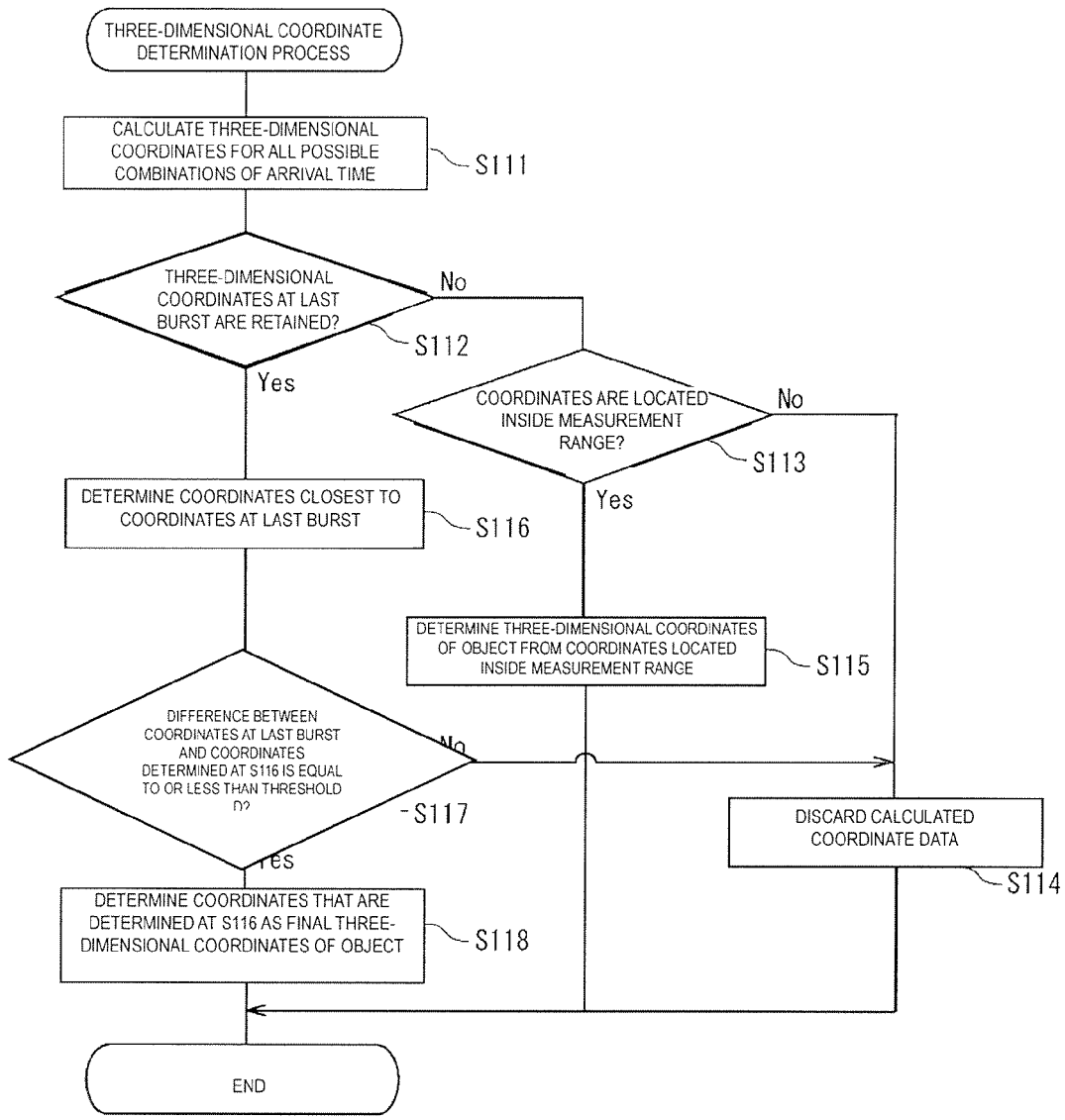
FIG. 7 is a flowchart illustrating process steps of a three-dimensional coordinate determination process with a position measurement device according to the first embodiment.

Next, referring to FIG. 7, the operation for determining the three-dimensional coordinates is described. FIG. 7 is a flowchart illustrating process steps of the three-dimensional coordinate determination process. The process of FIG. 7 is repeated with the coordinate calculation unit 44 and the coordinate determination unit 45 at every burst cycle during which the arrival time candidates are determined.

First, in step S111, the candidates of three-dimensional coordinates are calculated for all the possible combinations of the arrival time candidates. Here, each combination is composed of three arrival time candidates, one for each of the receiver 11 to 13, selected from the plurality of arrival time candidates $t_1$ to $t_3$. Next, in step S112, it is determined whether the three-dimensional coordinates finally determined at the last burst process cycle are retained or not. When the three-dimensional coordinates of the last burst process cycle are not retained, the process proceeds to step S113. In step S113, it is determined whether or not any one of the plurality of the candidates of three-dimensional coordinates calculated in step S111 is located inside the measurement range.

When it is determined that no candidate of three-dimensional coordinates is located inside the measurement range in step S113, the process proceeds to step S114. In step S114, data of the three-dimensional coordinates calculated in step S111 are discarded. In this case, a signal indicative of the absence of object inside the measurement range is outputted. On the other hand, when it is determined that one of the plurality of three-dimensional coordinates calculated in step S111 is located inside the measurement range in step S113, the process proceeds to step S115. In step S115, the candidate of three-dimensional coordinates located inside the measurement range is determined as the three-dimensional coordinates of the object. When there is a plurality of the candidates of three-dimensional coordinates inside the measurement range, one of the plurality of the candidates of three-dimensional coordinates is determined as the three-dimensional coordinates of the object based on predetermined criteria. For example, the candidate of three-dimensional coordinates that is the closest to the three-dimensional coordinates of a center of the measurement range is determined as the three-dimensional coordinates of the object.

On the other hand, in step S112, when it is determined that the three-dimensional coordinates finally determined at the last burst are retained, the process proceeds to step S116. In step S116, of the plurality of the candidates of three-dimensional coordinates calculated in step S111, the one closest to the three-dimensional coordinates obtained at the last burst is determined as the three-dimensional coordinates of the object. Subsequently, in step S117, it is determined whether or not the distance between the three-dimensional coordinates of the last burst and the three-dimensional coordinates determined in step S116 is equal to or less than the threshold d. When the foregoing distance exceeds the threshold d, the process proceeds to step S114. In step S114, data of the three-dimensional coordinates calculated in step S111 are discarded, and a signal is outputted to indicate the absence of object inside the measurement range.

On the other hand, in step S117, when it is determined that the distance between the three-dimensional coordinates of the last burst and the three-dimensional coordinates determined in step S116 is equal to or less than the threshold d, the process proceeds to step S118. In step S118, the three-dimensional coordinate determined in step S116 are finally determined and outputted as the three-dimensional coordinates of the object. Performing the foregoing process for each burst cycle allows detection of an object motion. For example, the object motion may be smoothly measured by repeating the measurement at a burst cycle of about 10 ms.

According to the position measurement device 1 of the present embodiment described above, a plurality of the arrival time candidates is determined. This increases the possibility of including accurate arrival time candidates. Further, a plurality of the candidates of three-dimensional coordinates is calculated based on the plurality of arrival time candidates thus determined. This improves the possibility of obtaining accurate candidates of three-dimensional coordinates. The three-dimensional coordinates of the object is determined based on these candidates of three-dimensional coordinates. This improves the possibility of obtaining accurate three-dimensional coordinates. Accordingly, the measurement accuracy may be improved by reducing noise effects in the position measurement device that measures three-dimensional coordinates of an object using ultrasound.

Further, in the present embodiment, of the peaks in the reflected wave, the arrival time candidates are additionally determined for the predetermined number of peaks occurring in the reflected wave immediately before and immediately after the peak in the envelope of the reflected wave. Accordingly, noise effects may be reduced, and accurate arrival time candidates may be determined. This further improves the measurement accuracy.

Further, in the present embodiment, the arrival time candidate determined at the current process cycle may be excluded if the difference between the propagation distance obtained at the last process cycle and the propagation distance of the arrival time candidate in question is equal to or larger than a threshold. In this way, the screening of the arrival time candidates may be performed after listing up a plurality of the arrival time candidates based on the propagation distance obtained at the last process cycle. This excludes the arrival time candidate that is likely to be incorrect. Accordingly, the measurement accuracy may be further improved.

Further, in the present embodiment, the candidate of three-dimensional coordinates is calculated for all the possible combinations of the arrival time candidates, each combination being composed of three arrival time candidates, one for each of the receiver 11 to 13, selected from the plurality of the arrival time candidates $t_1$ to $t_3$. As a result, the candidates of three-dimensional coordinate are calculated as much as the number of the possible combinations. Further, based on the candidates of three-dimensional coordinates thus calculated, the three-dimensional coordinates of the object is determined. In this way, the three-dimensional coordinates of the object is determined after listing up the candidates of three-dimensional coordinates obtained from all the possible combinations of the arrival time candidates. This further improves the measurement accuracy.

Further, in the present embodiment, of the plurality of the candidates of three-dimensional coordinates calculated by the coordinate calculation unit 44, one candidate of three-dimensional coordinates, the distance to which from the three-dimensional coordinates determined at the last process cycle is the shortest, is determined as the three-dimensional coordinates of the object. Here, in the case where the continuous measurement of a fingertip position is performed to detect a fingertip motion, it is considered that, of the plurality of candidates of three-dimensional coordinates, the candidate of three-dimensional coordinates that is closer to the last three-dimensional coordinates is more likely to be closer to the actual three-dimensional coordinates than the other, more-distant candidates of three-dimensional coordinates. This determines most probable three-dimensional coordinates out of the plurality of the candidates of three-dimensional coordinates. Thus, the measurement accuracy may be further improved.

Further, in the present embodiment, it is determined whether or not to accept the three-dimensional coordinates determined at the current process cycle based on the distance between the three-dimensional coordinates determined at the current process cycle and the three-dimensional coordinates determined at the last process cycle. This excludes data when the determined three-dimensional coordinates designate a position far away from the three-dimensional coordinates obtained at the last process cycle. In this way, validity of the three-dimensional coordinates obtained is determined. Thus, errors in the measurement results may be avoided.

In the present embodiment, the fingertip of index finger is used as an example of the target object of measurement. However, when there are other objects (for example, a thumb or part of palm or the like) that reflect the ultrasonic wave in a surrounding area of the target object of measurement, it is possible that the received wave (reflected wave) may additionally include ultrasonic waves reflected from objects other than the target object of measurement as noises. Further, in the example where the present embodiment is applied to the smartphone, the propagation distance of the reflected wave is relatively close to the distances between the transmitter 10 and the receivers 11 to 13. Thus, the received wave may include both the direct wave and the reflected wave. Thus, the direct wave may be not removed completely from the received wave even when the direct wave is subtracted from the received wave. Thus, it is possible that part of the direct wave may still remain in the reflected wave as noise. In this way, noise effects are relatively large in the application example of the present embodiment. However, when the foregoing measurement process is performed using a reflected wave illustrated in FIG. 5 and parameter settings of i=2 and j=1, (0 cm, 0.5 cm, 3 cm) are obtained as the three-dimensional coordinates (x, y, z) of an object. This is the measurement error equal to or less than 2 or 3 mm. Thus, favorable measurement accuracy is achieved.

Second Embodiment

Figure 8:
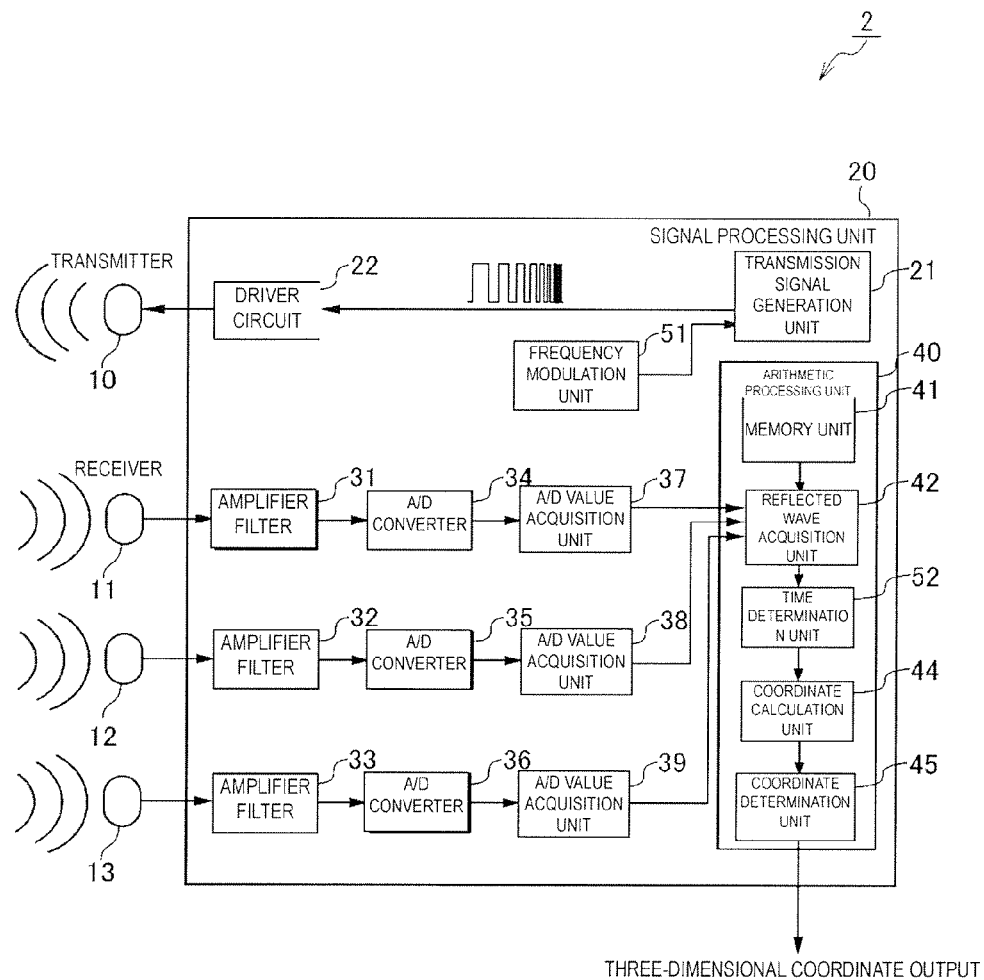
FIG. 8 is a block diagram illustrating a configuration of a position measurement device according to a second embodiment.

Referring to FIG. 8, the configuration of a position measurement device 2 according to the second embodiment is described. FIG. 8 is a block diagram illustrating the configuration of the position measurement device 2. The position measurement device 1 according to the foregoing first embodiment determines a plurality of the arrival time candidates from the peaks in the reflected wave. On the other hand, the position measurement device 2 according to the second embodiment emits a modulated ultrasonic wave by way of modulating a drive signal, and determines a plurality of the arrival time candidates based on a cross-correlation function for the drive signal and a reflected wave. Hereinafter, the position measurement device 2 is described mostly with regard to features different from the foregoing position measurement device 1 while descriptions of similar features are abbreviated.

The position measurement device 2 includes a frequency modulation unit 51 that modulates the drive signal. The frequency modulation unit 51 performs the modulation, for example, so as that the frequency of the drive signal included in one burst gradually may increase. The transmission signal generation unit 21 outputs a modulated drive signal to the driver circuit 22. As a result, the transmitter 10 emits an ultrasonic wave, the frequency of which is modulated within one burst, in response to the drive signal.

The arithmetic processing unit 40 included in the position measurement device 2 includes a time determination unit 52 that determines arrival time candidates based on a cross-correlation function, in place of the time determination unit 43 included in the position measurement device 1 of the foregoing first embodiment. The time determination unit 52 calculates a cross-correlation function for the reflected wave and the drive signal and determines a plurality of arrival time candidates based on the cross-correlation function. The cross-correlation function $Rxy(\tau)$ is defined by the following equation (2):

[Math 2]

$$Rxy(\tau) = \frac{1}{N-\tau} \sum_{t=0}^{N-1-\tau} x(t) \cdot y(t+\tau)(\tau = 0, 1, 2, \ldots, N-1) \quad (2)$$

Here, the function $x(t)$ represents the waveform of the drive signal, and the function $y(t)$ represents the waveform of the reflected wave at each one of the receivers 11 to 13.

Figure 9:
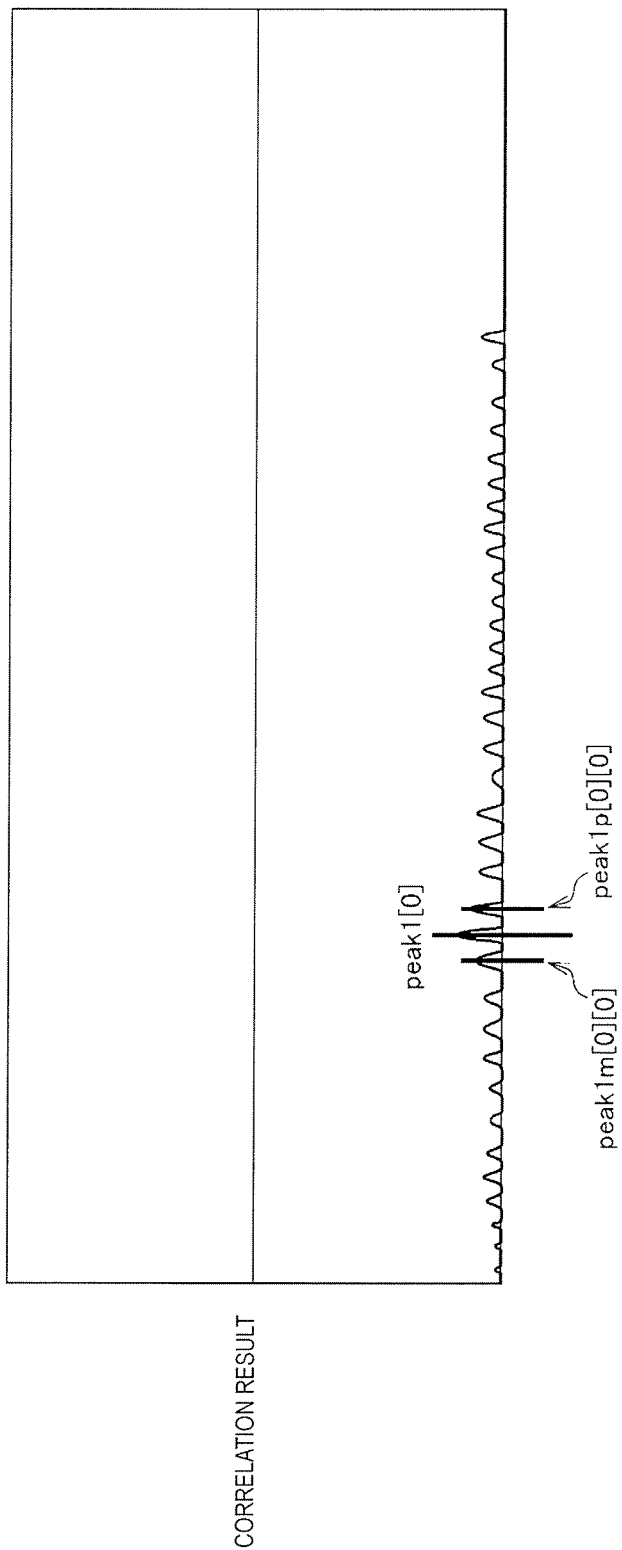
FIG. 9 is a diagram for illustrating an arrival time candidate determination method with a position measurement device according to the second embodiment.

FIG. 9 is a diagram for illustrating an arrival time candidate determination method, and a waveform therein represents the cross-correlation function $Rxy(\tau)$ for the reflected wave at the receiver 11 and the drive signal, namely, a correlation result. First, the time determination unit 52 identifies, of peaks in the envelope of the cross-correlation function $Rxy(\tau)$, i peaks (peak 1[i]) that are equal to or larger than a predetermined threshold in order from the beginning. In the example illustrated in FIG. 9, the parameter i is equal to 1. That is, peak 1[0] is identified.

Next, the time determination unit 52 identifies j peaks (peak 1m) of the cross-correlation function $Rxy(\tau)$ that occur immediately before the envelop peak (peak 1[i]) and j peaks (peak 1p) of the cross-correlation function $Rxy(\tau)$ that occur immediately after the envelop peak (peak 1[i]). In the example illustrated in FIG. 9, the parameter j is equal to 1. That is, peak 1m and peak 1p are identified.

Next, the time determination unit 52 determines arrival time candidates $t_1$ based on the peaks in the cross-correlation function $Rxy(\tau)$ thus determined. In the example illustrated in FIG. 9, three peaks in the cross-correlation function $Rxy(\tau)$ are identified for the receiver 11. Thus, three arrival time candidates $t_1$ are determined. Similarly, with regard to the receivers 12 and 13, three arrival time candidates $t_2$ and three arrival time candidates $t_3$ are determined, respectively.

Figure 10:
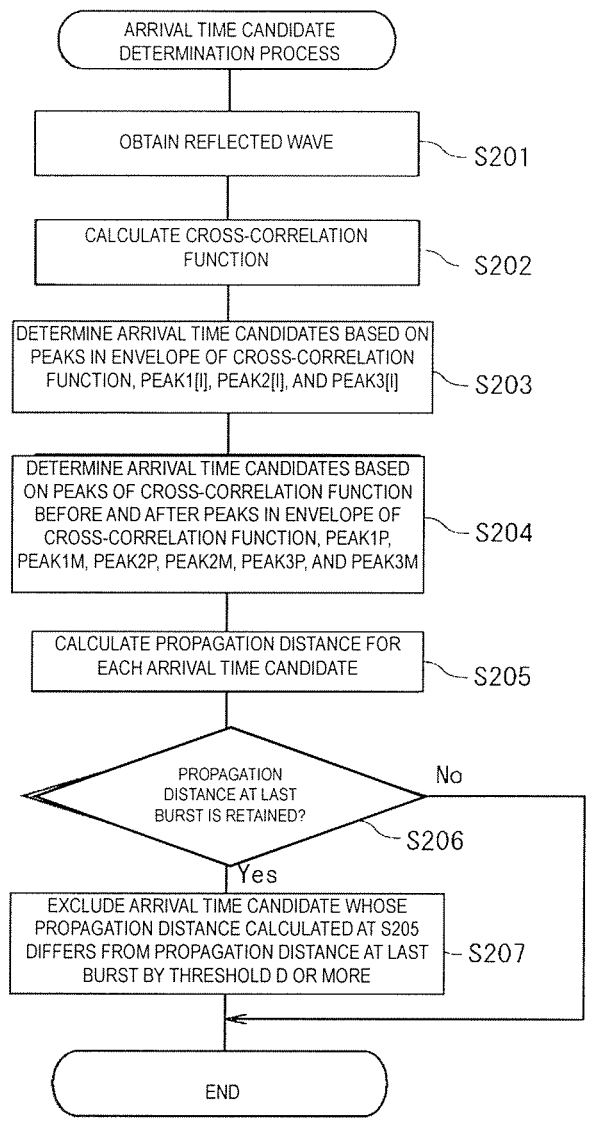
FIG. 10 is a flowchart illustrating process steps of an arrival time candidate determination process based on a cross-correlation function with a position measurement device according to the second embodiment.

Next, the operation of the position measurement device 2 is described. Referring to FIG. 10, the operation for determining the arrival time candidates is described. FIG. 10 is a flowchart illustrating process steps of an arrival time candidate determination process. The process of FIG. 10 is repeated at every burst cycle during which an ultrasonic wave is emitted.

After a reflected wave is obtained in step S201, in step S202, the cross-correlation function $Rxy(\tau)$ for the reflect wave and the drive signal is calculated for the respective receivers 11 to 13. Next, in step S203, i peaks in the envelope of the cross-correlation function $Rxy(\tau)$ are identified for each of the receivers 11 to 13, and arrival time candidates are determined based on these peaks. Further, in step S204, of peaks in the cross-correlation function $Rxy(\tau)$, peaks before and after the peak in the envelope are identified, and arrival times determined based on these peaks are added to the arrival time candidates. In the foregoing example of FIG. 9, the process steps described above obtain three arrival time candidates for each of the receivers 11 to 13.

In steps S205 to S207, the screening of the arrival time candidate is performed for the arrival time candidates $t_1$, $t_2$, and $t_3$ determined in the foregoing steps S203 and S204 by performing process steps similar to steps S104 to S106 of FIG. 6 of the first embodiment. The foregoing process determines a plurality of the arrival time candidates. Subsequently, as is the case with the first embodiment, a plurality of candidates of three-dimensional coordinates is calculated by using the plurality of the arrival time candidates $t_1$, $t_2$, and $t_3$ determined for the respective receivers 11, 12, and 13, and one candidate of the three-dimensional coordinates is determined as the three-dimensional coordinates of the object.

According to the position measurement device 2 of the present embodiment described above, temporal resolution may be improved in determining the arrival time candidates since the waveform representing the cross-correlation function for the reflected wave and the drive signal has sharper peaks than that of the reflected wave. Further, the noise effects may be reduced. Accordingly, the arrival time candidates may be determined with a higher accuracy, and the measurement accuracy may be further improved.

Note that, in the foregoing section, the cross-correlation function for the reflected wave and the drive signal is used. Alternatively, the direct wave may be used instead of the drive signal. In other words, the time determination unit 52 may calculate a cross-correlation function $Rxy(\tau)$ for the reflected wave and the direct wave stored in the memory unit 41, and determine a plurality of arrival time candidates based on this cross-correlation function $Rxy(\tau)$. In that case, the function $x(t)$ is a function representing the waveform of the direct wave. In this way, a waveform (cross-correlation function) that has more sharper peaks may be obtained since waveforms of the direct waves that are actually received by the receivers 11 to 13 are used. Thus, the temporal resolution may be further improved. Further, the noise effects may be further reduced. Accordingly, the arrival time candidate may be determined with a higher accuracy, and the measurement accuracy may be further improved.

Third Embodiment

Figure 11:
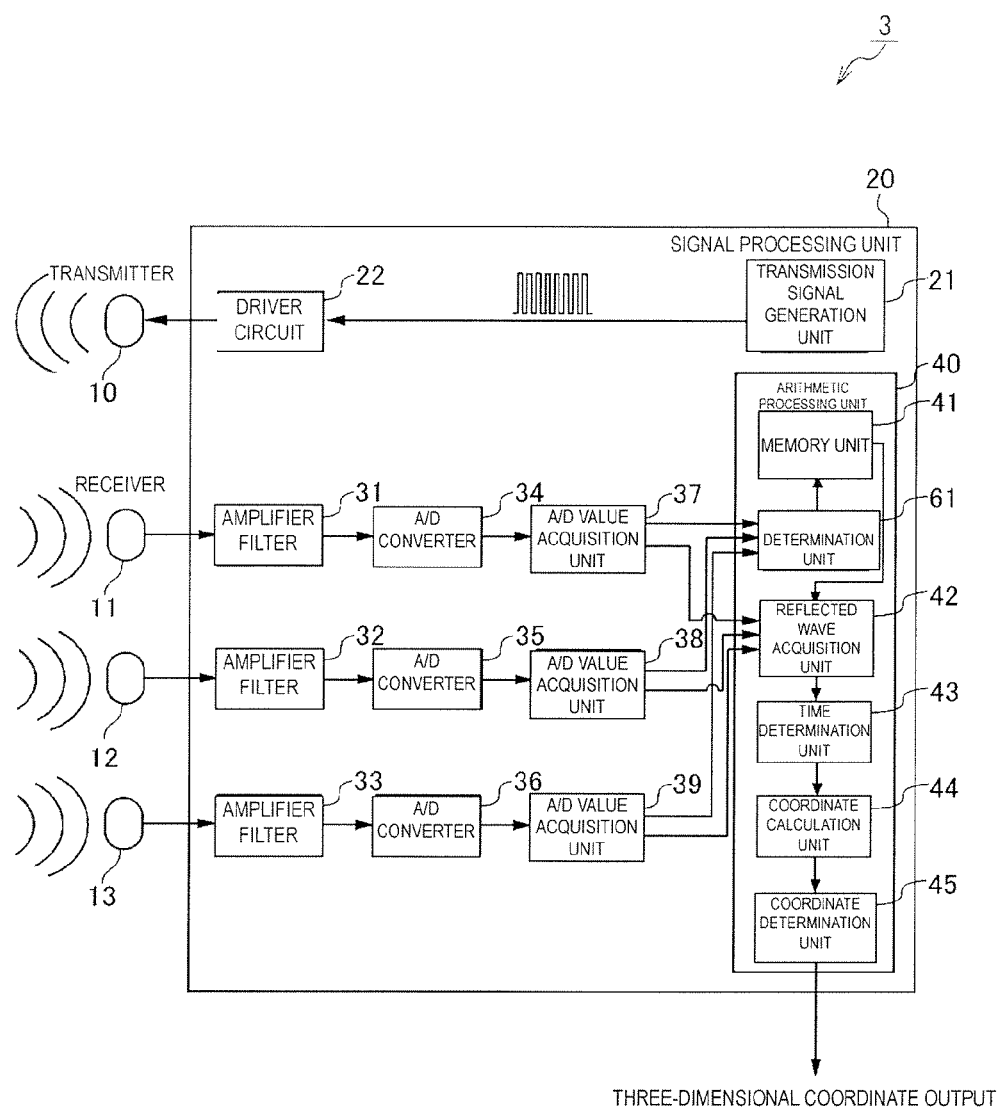
FIG. 11 is a block diagram illustrating a configuration of a position measurement device according to a third embodiment.

Referring to FIG. 11, the configuration of a position measurement device 3 according to the third embodiment is described. FIG. 11 is a block diagram illustrating the configuration of the position measurement device 3. The arithmetic processing unit 40 included in the position measurement device 3 further includes a determination unit 61 in addition to the constituting elements already included in the foregoing position measurement device 1. Hereinafter, the position measurement device 3 is described mostly with regard to features different from the foregoing position measurement device 1 while descriptions of similar features are abbreviated.

As described in the foregoing section, the reflected wave is obtained by subtracting the direct wave from the received wave. However, the timing at which the direct wave arrives at the receiver may vary due to variation in the speed of sound that varies depending on external environments such as temperature, flow speed of media, and the like. Thus, in order to obtain the direct wave in the environment under which the measurement is performed, the position measurement device 3 stores, as the direct wave, the received wave that is received in a state where the measurement range is empty of a target object of measurement. To do this, first, the determination unit 61 determines whether or not a target object of measurement is present in the measurement range.

The determination unit 61 allows the transmitter 10 to emit an ultrasonic wave in burst mode for multiple times. There would be some variation in the received wave when the target object of measurement moves. Thus, it may be determined that the target object of measurement is present in the measurement range. On the other hand, when there is no change in the received wave, it is evident that no moving object is present in the measurement range. When the target object of measurement is a finger for operating an apparatus, it is hard to imagine that a user could hold the finger still relative to the position measurement device 3. Thus, when there is no moving object in the measurement range, it may be determined that no target object of measurement is present in the measurement range. Accordingly, the determination unit 61 analyzes plural sets of the received waves obtained by the A/D value acquisition units 37 to 39, and determines that no target object of measurement is present in the measurement range when changes in waveforms of the received waves are equal to or less a predetermined manner.

When the presence or absence of object is being determined, the same drive signal as in the position measurement is used so that the ultrasonic wave to be emitted has the waveform similar to that of the transmission wave used in the position measurement. Further, when the determination unit 61 determines that no target object of measurement is present in the measurement range, the received wave used for the determination is empty of the reflected wave reflected from the target object of measurement. Thus, the received wave used for the determination may be used as the direct wave. Therefore, the memory unit 41 of the present embodiment stores the received waves received by the receivers 11 to 13 as the direct waves when the determination unit 61 determines that no target object of measurement is present in the measurement range. Note that, when it is determined that the target object of measurement is present in the measurement range, the memory unit 41 does not store new direct waves and keeps the direct waves that are already stored.

For example, in a case where the position measurement device 3 is installed in the smartphone 100, the determination unit 61 determines whether or not a target object of measurement is present every time power of the display 101 is turned on. Further, when it is determined that no target object of measurement is present, the direct wave is stored in the memory unit 41. Subsequently, processing for measuring an object position starts. With regard to the measurement processing, as in the foregoing process, the received waves obtained by the A/D acquisition units 37 to 39 are inputted to the reflected wave acquisition unit 42. Next, the direct wave stored in the memory unit 41 is subtracted from the received wave to determine the reflected wave.

According to the position measurement device 3 of the present embodiment described above, the direct wave may be automatically obtained and stored. This eliminates the need of processing (calibration) for storing the direct wave manually. Further, although the waveform of the direct wave varies depending on the external environments, the position measurement device 3 enables to store the direct wave that is obtained in the environments under which the actual position measurement is performed. This allows the reflected wave to be obtained using the direct wave reflecting the actual measurement environments. Thus, the measurement accuracy may be further improved by reducing effects of the external environments.

Although the embodiments of the present invention are described in the foregoing section, the present invention is not limited to the foregoing embodiments, and various modifications may be made. For example, in the foregoing embodiments, when identifying the peaks, the peaks immediately before and after the envelop peak are also identified from the peaks in the reflected wave or the cross-correlation function. However, the peak identification method is not limited thereto. Alternatively, the peaks only immediately before the envelope peak or only immediately after the envelope peak may be identified. Further, only a plurality of the envelope peaks may be identified without identifying any peaks immediately before or immediately after the envelope peak. Further, in the foregoing second embodiment, the frequency of the ultrasonic wave is modulated. However, the modification method is not limited thereto. Instead, the amplitude may be modulated or a digital modulation may be performed.

Further, in the foregoing embodiments, a plurality of the arrival time candidates are determined for each of the three receivers 11 to 13. Alternatively, a plurality of the arrival time candidates may be determined only for one or two receivers. Determining a plurality of the arrival time candidates for at least one receiver allows to obtain a plurality of the candidates of three-dimensional coordinates, and this improves the measurement accuracy.

Further, in the foregoing embodiments, when determining the arrival time candidates based on the received wave, the arrival time candidate is determined based on the reflected wave after obtaining the reflected wave from the received wave. However, the arrival time candidate determination is not limited thereto. Alternatively, the arrival time candidate may be determined from the received wave without performing processing such as subtracting the direct wave from the received wave. However, in the case where the reflected wave and the direct wave overlap each other, it is preferable to include a mechanism for preventing direct propagation of an ultrasonic wave emitted from the transmitter 10 to the receivers 11 to 13 without being reflected from an object. For example, shielding members may be disposed at the respective receivers 11 to 13 on their sides facing the transmitter 10 so that the receivers 11 to 13 do not receive the ultrasonic wave propagating from the sides facing the transmitter 10.

Further, in the foregoing embodiments, it is assumed that the number of the receivers is three. However, four or more receivers may be used as well. When four or more receivers are used, it is not necessary to arrange all of the receivers and the transmitter on the same plane. Further, even in the case where three receivers are used, all of the receivers and the transmitter may not be necessarily arranged on the same plane when other information enables to determine three-dimensional coordinates of an object. Further, in the foregoing embodiments, the transmitter 10 and the receivers 11 to 13 are arranged at apexes of rectangle. However, the arrangement of the transmitter 10 and the receivers 11 to 13 is not limited thereto. For example, in some applications, the receivers 11 to 13 may be arranged at apexes of an equilateral triangle, and the transmitter 10 may be disposed at the center of gravity of the equilateral triangle. In this case, distances between the transmitter 10 and the respective receivers 11 to 13 are equal to each other. Thus, the accuracy may be further improved.

Note that the speed of sound varies depending on external environments such as temperature, flow speed of media, and the like. Thus, variation in the speed of sound may cause an error in the propagation distance when the propagation distance is calculated by multiplying the arrival time candidate by the speed of sound and the speed of sound is set at a constant value. On the other hand, the peak that appears first in the received wave represents the instance at which the direct wave arrives. The propagation distance of this direct wave is constant. Thus, it is also preferable that the value of the speed of sound may be corrected based on the instance at which the first peak appears in the received wave.

Further, in the foregoing embodiments, when determining the three-dimensional coordinates of the object based on a plurality of the candidates of three-dimensional coordinates that are calculated, the candidate of three-dimensional coordinates that is the closest to the three-dimensional coordinates determined at the last process cycle is determined as the three-dimensional coordinates of the object. However, the determination method of the three-dimensional coordinates of an object is not limited thereto. Alternatively, arbitrary criteria corresponding to the target object of measurement may be used to select one candidate of the three-dimensional coordinates from a plurality of the candidates of three-dimensional coordinates. Further, the one candidate of the three-dimensional coordinates thus selected may be further corrected.

Further, in the foregoing examples, the fingertip is considered as the target object of measurement. However, the target object of measurement may be any object that reflects an ultrasonic wave. Further, in the foregoing examples, it is assumed that the position measurement devices 1 to 3 according to the present invention are each used as an input device of the smartphone 100. However, the application of the position measurement device is not limited thereto. For example, the position measurement devices 1 to 3 may be used as non-contact input devices for electric home appliances such as TVs, personal computers, game machines, and the like, and for vending machines of tickets and the like.

REFERENCE SIGNS LIST 1, 2, 3 Position measurement device
10 Transmitter
11, 12, 13 Receiver
41 Memory unit
42 Reflected wave acquisition unit
43, 52 Time determination unit
44 Coordinate calculation unit
45 Coordinate determination unit
51 Frequency modulation unit
61 Determination unit

The invention claimed is:

1. A position measurement device for measuring a position of an object using ultrasound, the device comprising:
   a transmitter configured to emit an ultrasonic wave;
   at least three receivers each configured to receive a received ultrasonic wave;
   a time determination unit configured to determine respective arrival time candidates for each receiver based on the received wave received by each receiver, wherein the respective arrival time candidates are time periods from emission of the ultrasonic wave to reception of the received ultrasonic wave;
   a coordinate calculation unit configured to calculate a plurality of candidates of three-dimensional coordinates indicative of positions of the object based on the arrival time candidates; and
   a coordinate determination unit configured to determine three-dimensional coordinates of the object based on the plurality of candidates of three-dimensional coordinates.

2. The position measurement device according to claim 1, further comprising:
   a memory unit configured to store respective direct waves emitted from the transmitter and directly received by each receiver; and
   a reflected wave acquisition unit configured to obtain a reflected wave received by each receiver after being reflected from the object by subtracting the respective direct wave stored in the memory unit from the received wave received by the respective receiver,
   wherein the time determination unit determines the respective arrival time candidates for each receiver based on the respective reflected wave obtained by the reflected wave acquisition unit.

3. The position measurement device according to claim 2, wherein the time determination unit is further configured to determine the arrival time candidate based on timing at which a peak occurs in an envelope of the reflected wave.

4. The position measurement device according to claim 3, wherein the time determination unit is further configured to determine the arrival time candidates based on timings at which a predetermined number of peaks occur in the reflected wave before or after the peak in the envelope of the reflected wave.

5. The position measurement device according to claim 2, wherein the transmitter is further configured to emit a modulated ultrasonic wave, and
   wherein the time determination unit is further configured to calculate a cross-correlation function for the reflected wave and the direct wave for each receiver, and to determine the respective arrival time candidates based on the cross-correlation function.

6. The position measurement device according to claim 2, wherein the transmitter is further configured to emit an ultrasonic wave in response to a modulated drive signal, and
   wherein the time determination unit is further configured to calculate a cross-correlation function for the drive signal and the reflected wave for each receiver, and to determine the respective arrival time candidates based on the cross-correlation function.

7. The position measurement device according to claim 1, wherein the time determination unit is further configured to determine for each candidate of the plurality of the arrival time candidates whether the candidate in question is to be excluded based on propagation distances calculated for respective candidates of the plurality of the arrival time candidates and a propagation distance used for calculating three-dimensional coordinates determined by the coordinate determination unit at a last process cycle.

8. The position measurement device according to claim 1, wherein the coordinate calculation unit is further configured to calculate the candidates of three-dimensional coordinates for all combinations of the arrival time candidates, one for each receiver, selected from the plurality of arrival time candidates determined by the time determination unit.

9. The position measurement device according to claim 1, wherein the coordinate determination unit determines the three-dimensional coordinates of the object based on which candidate of three-dimensional coordinates has a shortest distance determined at a last process cycle.

10. The position measurement device according to claim 1, wherein the coordinate determination unit determines that the three-dimensional coordinates determined at a current process cycle is the three-dimensional coordinates of the object based on the distance between the three-dimensional coordinates determined at the current process cycle and the three-dimensional coordinates determined at a last process cycle.

11. The position measurement device according to claim 2, further comprising:
a determination unit configured to determine whether a target object is positioned inside a measurement range, wherein
the memory unit is further configured to store the received wave received by each receiver as the respective direct wave when the determination unit determines absence of the target object in the measurement range.

12. The position measurement device according to claim 1, wherein the transmitter and the at least three receivers are disposed on a same plane of a rectangular housing and at positions of respective vertices of rectangle of the housing.

13. A position measurement method for measuring a position of an object using ultrasound, the method comprising:
emitting an ultrasonic wave;
receiving, by at least three receivers, respective received ultrasonic waves;
determining respective arrival time candidates for each receiver based on the received wave received by each receiver, wherein the respective arrival time candidates are time periods from emission of the ultrasonic wave to reception of the received ultrasonic wave;
calculating a plurality of candidates of three-dimensional coordinates indicative of positions of the object based on the arrival time candidates; and
determining three-dimensional coordinates of the object based on the plurality of candidates of three-dimensional coordinates.

14. The position measurement method according to claim 13, further comprising:
storing respective direct waves received by each receiver;
obtaining a reflected wave received by each receiver after being reflected from the object by subtracting the respective direct waves from the received wave received by the respective receiver; and
determining the respective arrival time candidates for each receiver based on the respective reflected wave.

15. The position measurement method according to claim 14, further comprising determining the arrival time candidate based on timing at which a peak occurs in an envelope of the reflected wave.

16. The position measurement method according to claim 15, further comprising determining the arrival time candidates based on timings at which a predetermined number of peaks occur in the reflected wave before or after the peak in the envelope of the reflected wave.

17. The position measurement method according to claim 14, further comprising:
emitting a modulated ultrasonic wave;
calculating a cross-correlation function for the reflected wave and the direct wave for each receiver; and
determining the respective arrival time candidates based on the cross-correlation function.

18. The position measurement method according to claim 14, further comprising:
emitting an ultrasonic wave in response to a modulated drive signal;
calculating a cross-correlation function for the drive signal and the reflected wave for each receiver; and
determining the respective arrival time candidates based on the cross-correlation function.

19. The position measurement method according to claim 13, further comprising determining for each candidate of the plurality of the arrival time candidates whether the candidate in question is to be excluded based on propagation distances calculated for respective candidates of the plurality of the arrival time candidates and a propagation distance used for calculating three-dimensional coordinates determined at a last process cycle.

20. The position measurement method according to claim 13, further comprising determining the three-dimensional coordinates of the object based on which candidate of three-dimensional coordinates has a shortest distance determined at a last process cycle.

* * * * *